United States Patent [19]

Black

[11] 4,298,926
[45] Nov. 3, 1981

[54] POWER CONVERTER

[75] Inventor: James M. Black, Quartz Hill, Calif.

[73] Assignee: The United States of America as represented by the Administrator of the National Aeronautics and Space Administration, Washington, D.C.

[21] Appl. No.: 53,652

[22] Filed: Jun. 29, 1979

[51] Int. Cl.$^3$ .................... H02M 7/537; H02M 7/25
[52] U.S. Cl. ..................................... 363/132; 363/61; 363/17; 331/113 R
[58] Field of Search ................... 363/17, 60–61, 363/131–132; 331/108 A, 110, 113 R, 138, 140

[56] References Cited

U.S. PATENT DOCUMENTS

| 3,465,231 | 9/1969 | Hyde | 363/17 |
| 3,579,078 | 5/1971 | Cronin et al. | 363/17 |
| 3,596,146 | 7/1971 | McDonald | 331/113 R |
| 3,723,846 | 3/1973 | Thompson, Jr. | 363/61 |
| 3,902,108 | 8/1975 | Sion | 363/61 |

OTHER PUBLICATIONS

D. D. Baumann, "Free Running Bridge Inverter", IBM Technical Disclosure Bulletin, vol. 9, No. 10, Mar. 1967, p. 1462.
Millman & Taub, "Pulse, Digital and Switching Waveforms", McGraw-Hill, 1965, Section 11–12, pp. 438–441.

Primary Examiner—William M. Shoop
Assistant Examiner—Peter S. Wong
Attorney, Agent, or Firm—Paul F. McCaul; John R. Manning

[57] ABSTRACT

A DC-to-DC converter employs four transistor switches in a bridge to chop DC power from a source, and a voltage multiplying diode rectifying ladder network to rectify and filter the chopped DC power for delivery to a load. The bridge switches are cross-coupled in order for diagonally opposite pairs to turn on and off together using RC networks for the cross-coupling to achieve the mode of operation of a free running multivibrator, and the diode rectifying ladder is configured to operate in a push-pull mode driven from opposite sides of the multivibrator outputs of the bridge switches. The four transistor switches provide a square-wave output voltage which has a peak-to-peak amplitude that is twice the input DC voltage, and is thus useful as a DC-to-AC inverter.

8 Claims, 9 Drawing Figures

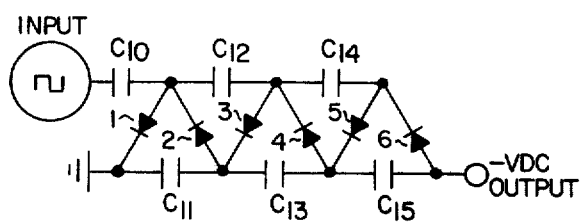
FIG. 4 PRIOR ART
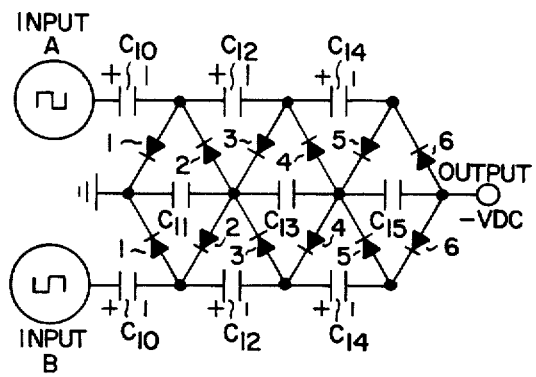
FIG. 5 PRIOR ART OF FIG. 4 BACK TO BACK
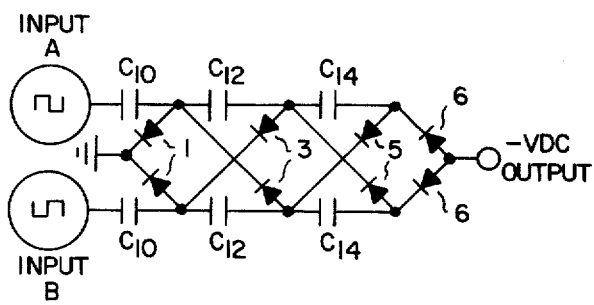
FIG. 6
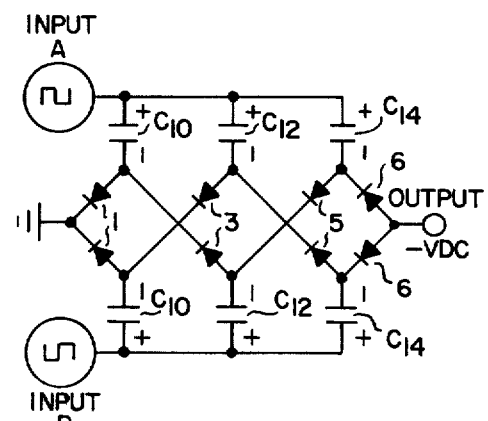
FIG. 7
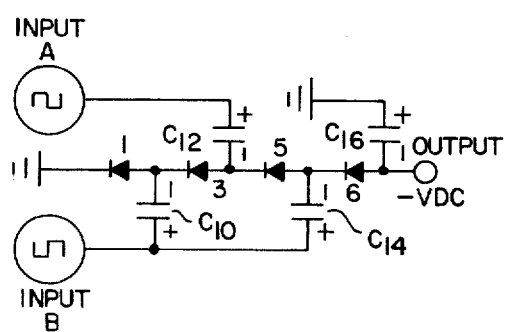
FIG. 8
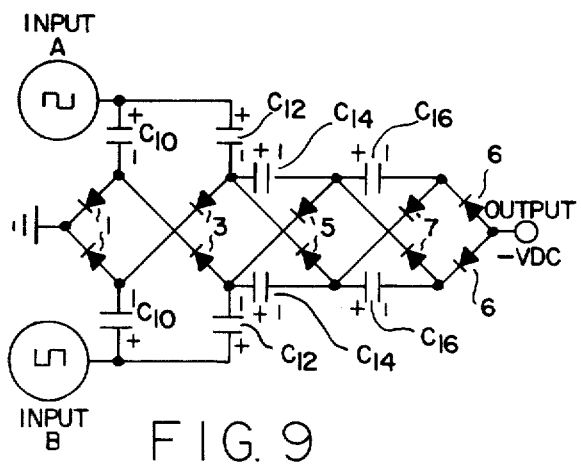
FIG. 9

POWER CONVERTER

ORIGIN OF INVENTION

The invention described herein was made by an employee of the United States Government and may be manufactured and used by and for the Government for governmental purposes without the payment of any royalties thereon or therefore.

BACKGROUND OF THE INVENTION

This invention relates to power converters, and more particularly to a circuit for efficient use of transistor switches to chop DC power from a source, and a voltage multiplying diode rectifying ladder network to rectify and filter the chopped power delivered to a load.

Photo flash units for camera, geiger counters, and other electronic equipment require a source of high voltage DC current to operate. Since the primary source is often an inexpensive low voltage battery, a step-up DC-to-DC converter is required. Long battery life is usually desirable and therefore a high conversion efficiency is required. This invention meets these requirements.

About one-half of the present integrated circuit equipments require, in addition to a low voltage source (such as +5 VDC), a higher voltage source (such as +10 VDC, −10 VDC, or −15 VDC). This is also true of many of the microprocessors which are currently in popular demand. To supply these higher voltage and mixed power requirements, power supplies using AC inputs with transformer-rectifiers, multi-battery packs, or DC-to-DC converters are available; however, they have undesirable features, such as: requiring a source of AC voltage; transformers that are large or heavy; designs that are costly; and/or do not have a high conversion efficiency. There is a need for a step-up DC-to-AC or DC-to-DC converter that is not only efficient and inexpensive, but also light and not bulky, i.e., implemented without a transformer.

One application of particularly high potential use is in the displays for electronic calculators and instrument displays. There are four types of displays currently available: LED (light emitting diode); LCD (liquid crystal display); fluorescent; and neon. To date, the market prefers LEDs and LCDs, although some products, like pocket calculators and cash registers, are using fluorescent displays which are aesthetically pleasing and brighter than LEDs. LEDs operate on low voltage, but have a high current drain upon the battery and present a rather harsh display. LCDs still have cost, response time, and temperature characteristic problems. And while neon displays have none of these drawbacks, they need a very efficient DC-to-DC step-up converter to operate from a low cost, low voltage battery source because they require 180 VDC starting potential. This invention may supply this need for neon displays. Many fluorescent lighting fixtures also require a source of high voltage for starting current. Cathode ray tubes, television picture tubes, and photo multipliers also require a high voltage, low current source. The list of potential users of this invention is extensive. For example, the invention was first developed and used to supply a 12 volt negative DC source to circuitry in a television test signal generator. The invention was next used as a DC-to-AC inverter to power a gyro used on a remotely piloted airplane. Other immediate uses are contemplated wherever conversion of DC power is required, especially for battery operated systems which are weight and size limited and require high conversion efficiency to conserve battery power. Prior state-of-the-art systems tend to be heavier and less efficient than desired for spacecraft and other lightweight applications. Use is also contemplated whenever an efficient DC-to-AC conversion is required such as the gyro application mentioned above, in which case the circuit is often called an inverter.

OBJECTS AND SUMMARY OF THE INVENTION

An object of this invention is to provide a circuit for converting a source of DC power of one voltage to a source of power of another voltage. Another object is to provide such a circuit with high conversion efficiency. Still another object is to provide a converter with a minimum weight.

In summary, these and other objects of the invention are achieved by a self-oscillating, transformerless bridge circuit for chopping DC-power from a source and with a peak-to-peak voltage amplitude that is twice the input DC voltage, and where DC-to-DC conversion is desired, a voltage multiplying rectifier and filter for delivery of DC power to a load with a minimum of components. The bridge circuit is comprised of a first pair of transistors of one conductivity type on adjacent sides of the bridge, and a second pair of transistors of opposite conductivity in the remaining sides of the bridge, each transistor being connected as a switch to control the flow of current through a side of the bridge in response to a voltage applied to control terminals thereof. A source of DC voltage is connected to the bridge across junctions where transistors of the same conductivity type are joined, and the control terminals of two joined transistors of opposite conductivity are connected to the junction between the other two transistors of opposite conductivity through an RC timing circuit such that diametrically opposite transistors of opposite conductivity types first conduct for a period determined by the RC timing circuit and then the other diametrically opposite transistors conduct in a free running multivibrator mode. A chopped output is obtained at terminals connected to the bridge at junctions where transistors of opposite conductivity types are joined. This chopped output is applied to a voltage multiplying rectifier and filter comprised of diodes and capacitors connected in a ladder configuration to provide half wave, or full wave rectification, and develop a DC output that is, except for forward diode voltage drops, a multiple of the peak-to-peak chopped output of the bridge, depending upon how many capacitor sections are stacked between the chopped input and DC output. For full wave rectification, two sets of diodes are connected in series between circuit ground and the output. Alternate junctions (odd numbered ones starting at ground) of one set are connected to receive one chopped voltage input through separate capacitors, and the remaining junctions of the one set are connected to receive the other chopped voltage input through separate capacitors. The same is true for the other set of diodes. The capacitors that receive each chopped voltage input are connected to receive the voltage in series or in parallel, or partly in series and in parallel. For a halfwave configuration, one set of series connected diodes is omitted, together with the capacitors that would normally be connected to it.

The novel features of the invention are set forth with particularity in the appended claims. The invention will best be understood from the following description when read in conjunction with the accompanying drawings.

BRIEF DESCRIPTION OF THE DRAWINGS

FIGS. 4 and 5 illustrate prior-art voltage multiplying rectifiers which may be used in the combination of FIG. 1.

FIG. 6 illustrates a preferred embodiment of a full-wave voltage multiplying rectifier and filter in accordance with one part of the invention for use in the combination of FIG. 1.

FIG. 7 illustrates an alternative configuration for the voltage multiplying rectifier and filter of FIG. 6.

FIG. 8 illustrates an alternative for the embodiment of FIG. 7 useful for half-wave rectification and filtering.

FIG. 9 illustrates an embodiment that is half like that of FIG. 7 and half like that of FIG. 6.

DESCRIPTION OF PREFERRED EMBODIMENTS

Figure 1:
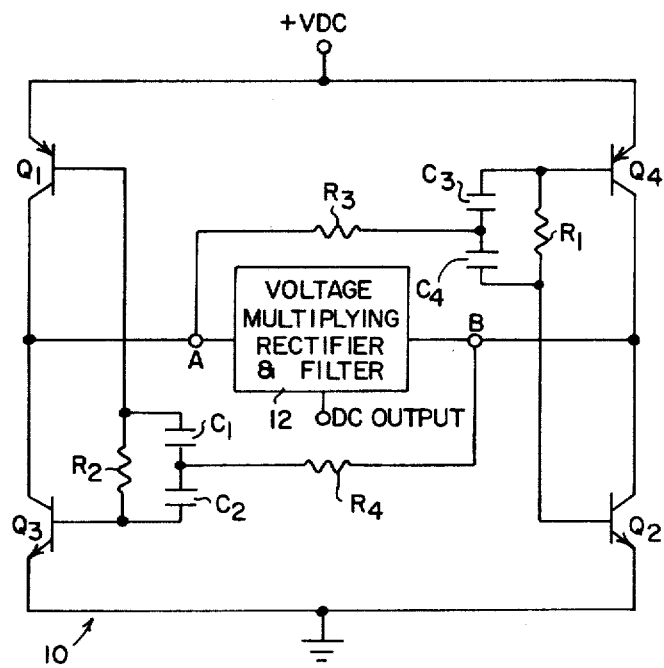
FIG. 1 is a schematic diagram of a free running chopper for inverting DC to AC with a voltage multiplying rectifier and filter of a configuration shown in FIG. 6, 7, 8 or 9.

Referring now to FIG. 1, there is shown a bridge circuit 10 comprised of bipolar power transistors $Q_1$ through $Q_4$. One pair, transistors $Q_1$ and $Q_4$, are of the same conductivity type shown as PNP junction transistors, although a P-channel field effect transistor could be used instead. The other pair, transistors $Q_2$ and $Q_3$, are of opposite conductivity type, namely NPN junction transistors, as shown, or N-channel. The emitters of transistors $Q_1$ and $Q_4$ are connected to a source of DC voltage (+VDC) and the emitters of the transistors $Q_2$ and $Q_3$ are connected to circuit ground (or the negative terminal of the voltage source). The bases (control terminals) of the transistors $Q_1$ and $Q_3$ on one side of the power supply connections are connected to one bridge output terminal B through RC timing circuits and also to each other through a resistor $R_2$, and the bases of the transistors $Q_2$ and $Q_4$ on the other side of the power supply connections are connected to an output terminal A through RC timing circuits and also to each other through a resistor $R_1$. The output terminal B is thus coupled to the bases of the transistors $Q_1$ and $Q_3$ through capacitors $C_1$ and $C_2$. Similarly the output terminal A is coupled to the bases of the transistors $Q_4$ and $Q_2$ through capacitors $C_3$ and $C_4$.

Figure 2:
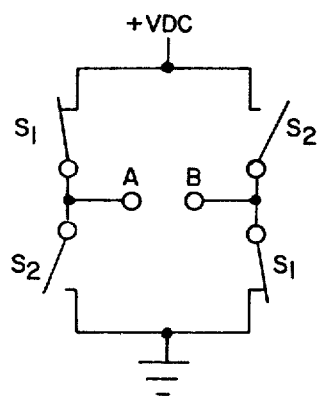
FIGS. 2 and 3 illustrate the operation of the free running chopper using idealized switches to represent transistors of the chopper.
Figure 3:
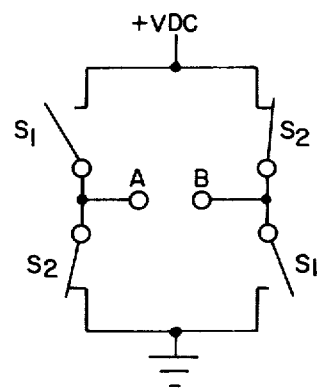

Operation of this configuration of cross-coupled transistors in a bridge circuit 10 is illustrated by FIGS. 2 and 3 in which transistors are represented by ideal switches controlled so that switches labeled $S_1$ first close while those labeled $S_2$ open (FIG. 2) so that output terminal B is at ground potential while the output terminal A is at the DC input potential, and then switches labeled $S_1$ open while those labeled $S_2$ close (FIG. 3) so that the output terminal A is at ground potential while the output terminal B is at the DC input potential. Switches $S_1$ obviously represent transistors $Q_1$ and $Q_2$ in the same positions of the bridge, while switches $S_2$ represent the transistors $Q_3$ and $Q_4$.

This operation of the switches $S_1$ and the switches $S_2$ results in a squarewave output voltage between terminals A and B which has a peak-to-peak amplitude that is twice the input DC voltage. This effective voltage doubling over that which would be obtained from a two switch system is important from the standpoint of conversion efficiency.

The ideal switches shown in FIG. 2 and FIG. 3 should have zero contact resistance when closed, infinite resistance when open, and operate at a high frequency rate. The switches must also be precisely timed to preclude shorting the DC input to ground by switches $S_1$ and $S_2$ closing at the same time. This ideal switching is closely achieved by the invention as shown in FIG. 1. Zero contact resistance in the switching is effectively achieved by virtue of the fact that the only resistance present is the saturation resistance of the bipolar power transistors which are readily available with values of saturation resistance less than 0.1 ohm. This allows the circuit to operate with DC input levels as low as 1.5 volts and is also part of the reason that the invention achieved a high conversion efficiency. When the transistors are switched off, they present an open circuit that is effectively of infinite resistance for all practical purposes, thus achieving a second requirement of the ideal switching network. A third requirement, the precisely timed, high frequency operation of the switches is achieved through the use of the resistors $R_1$, $R_2$ and capacitors $C_1$, $C_2$, $C_3$, and $C_4$.

When the DC source voltage is first applied, electron flow occurs from ground through $Q_3$, $R_2$, and $Q_1$ in series and also through $Q_2$, $R_1$, and $Q_4$ in series. This partially turns on all four transistors, $Q_1$, $Q_2$, $Q_3$, and $Q_4$. This is the first phase of the self starting feature which lasts only a fraction of a second. Next, noise which is always present at a very small amplitude triggers the system into oscillation through the coupling capacitors $C_1$, $C_2$, $C_3$, and $C_4$. For example, at first turn on, transistors $Q_1$, $Q_2$, $Q_3$, and $Q_4$ are all conducting approximately equally and if noise causes $Q_3$ to conduct less, a positive going potential on output terminal A is passed through a resistor $R_3$ in series with $C_3$ to the base of $Q_4$ turning $Q_4$ off, and likewise the positive going potential at terminal A is passed through $R_3$ in series with $C_4$ to the base of $Q_2$ turning $Q_2$ on. This causes output terminal B to go more negative turning $Q_3$ off and $Q_1$ on, which further turns $Q_2$ on and $Q_4$ off until the state where both $Q_3$ and $Q_4$ are full off and $Q_1$ and $Q_2$ are full on is rapidly achieved. This state with transistors $Q_3$ and $Q_4$ full on and transistors $Q_1$ and $Q_2$ full off is maintained for a time determined by the RC time constants of the system capacitors such as capacitor $C_3$ and resistor $R_1$ for transistor $Q_4$ while transistor $Q_2$ is on. Thereafter, the state of the switches rapidly reverses. The result is a squarewave output of the desired frequency between output terminals A and B. Resistors $R_2$ and $R_4$ are used to limit base current flowing into or out of transistors $Q_1$, $Q_2$, $Q_3$, and $Q_4$ during the time of switching transition.

The second part of the invention is the voltage multiplying rectifier and filter (hereafter called a "stack"), variations of which are shown in FIGS. 6 through 9. The prior art method is shown in FIG. 4 and also in FIG. 5. A theoretical analysis of this prior art, as written under contract by Standford University, is contained in a paper by J. S. Brugler, "Theoretical Performance of Voltage Multiplier Circuits," IEEE Journal of Solid State Circuits, June, 1971, pp. 132-135. A less theoretical discussion is contained in an article by Walter Wills, "Get high voltage with low-cost multipliers,"

Electronic Design 13, June 21, 1974, pp. 64-68. The subtitle of this article states "If it's a low-current application, simple diode-capacitor networks can be cascaded to deliver any voltage you need." The prior art of FIG. 4 is found extensively in the literature, but the more efficient approaches of FIGS. 6 through 9 have not been found elsewhere.

The operation of these new rectifier stacks are understood by first understanding the operation of the prior art rectifier stack of FIG. 4. When the input voltage is positive, a diode 1 shunts current to ground, but when it is negative it charges a capacitor $C_{11}$ negative through diode 2. Subsequent cycles continue to charge the capacitor $C_{11}$ more negative, and while diode 2 is switched off during a positive half cycle capacitor $C_{12}$ charges, through a diode 3, and so on, until all of the capacitors are charged. The input capacitor $C_{10}$ serves merely to AC couple the input squarewave voltage, and the odd numbered capacitors serve merely to bootstrap the charge up the even numbered capacitors which, because they are in series, multiply the voltage rectified by the diodes connected in series between ground and the output terminal. This is perhaps the simplest explanation that can be given to understand the operation of this well known halfwave voltage multiplying rectifier and filter. FIG. 5 shows two rectifier stacks of FIG. 4 back to back sharing four capacitors in common. These four common capacitors will be found to have a DC charge only (i.e., constant charge) due to the use of a second squarewave input and therefore the four capacitors serve no purpose and may be eliminated without changing the operation of the circuit. Once the four capacitors are eliminated, it can be seen that alternate diodes 2 and 4 are redundant and can also be eliminated, thus, further reducing the parts count and resulting in one embodiment of the invention shown in FIG. 6. This and all other embodiments are not limited to the number of stages shown, but may be used with one or more stages of any number.

FIG. 6 is a preferred form of the invention, and FIG. 7 is an alternate form of the invention. FIG. 8 is a halfwave configuration of the invention, and FIG. 9 is a form that combines the configuration of FIG. 7 with that of FIG. 6. In these new and improved stacks, the same reference numerals are being retained as for corresponding elements in the prior art to facilitate understanding their organization and operation from the description of the prior art in FIGS. 4 and 5. Operation of the elements remaining in the improved stacks is the same; the improvement is in the elimination of elements found to be not necessary. The invention in the stacks is in the reduction of elements or parts which results in greater conversion efficiency, with the further variation of inputs A and B being applied directly to the capacitors in series in the configuration FIG. 6 and in parallel in the configurations of FIGS. 7 and 8, and in series-parallel in the combination of those configurations in FIG. 9. Note that in all of these configurations of FIGS. 6, 7, 8 and 9, diodes identified by the reference numeral 6 are retained at the output for isolation of the last stage. In the configuration of FIG. 9 there are two stages of the configuration of FIG. 7 followed by two stages of the configuration of FIG. 6. In the half-wave configuration of FIG. 8, half the capacitors and diodes of the configuration of FIG. 7 are omitted, and an additional filter capacitor $C_{16}$ is added.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A converter having four transistors interconnected at four junctions to form a four-sided bridge circuit, with one transistor on each of the four sides of the bridge, and means for alternately turning on and off said transistors in pairs on opposite sides so that an AC voltage is obtained from one pair of opposite junctions while a DC voltage is applied to the remaining pair of junctions, one of said switches in each pair being of one conductivity type and the other of said switches in each pair being of opposite conductivity type, with transistors connected to common DC junctions being of the same conductivity type, said means for alternately turning on and off said transistors comprising RC timing circuits cross coupling control terminals of said transistors with control terminals of both transistors in adjacent sides of said bridge being AC coupled to an AC junction on the opposite side of said bridge, each of said RC timing circuits being comprised of a resistor connected between control terminals of said transistors on adjacent sides of said bridge, two capacitors connected in series between control terminals of said transistors on adjacent sides of said bridge, and a resistor connected between the AC junction on the opposite side of said bridge and a junction between said series connected capacitors, whereby said transistors connected in a bridge circuit are operated in a free running multivibrator mode for converting said DC voltage to AC voltage.

2. A converter as defined in claim 1 including means connected to said one pair of AC junctions for voltage multiplying, rectifying and filtering the AC voltage obtained from said bridge circuit, wherein said voltage multiplying, rectifying and filtering means is comprised of a set of diodes connected in series between circuit ground and a DC output terminal, and a plurality of capacitors divided into two sets, one set connected to alternate junctions between diodes beginning with the junction of the first diode connected to circuit ground and the next diode in series, and the other set of capacitors connected to the remaining junctions, said one set of capacitors being connected to one of said pair of AC junctions and the other set of capacitors being connected to the other one of said pair of AC junctions.

3. A converter as defined in claim 2 wherein each of said one set of capacitors is connected directly to said one of said pair of AC junctions, and each of said other set of capacitors is connected directly to the other of said pair of AC junctions.

4. A converter as defined in claim 2 including a second set of diodes connected in series between circuit ground and said DC output terminal and additional capacitors in said first and second sets of capacitors for connection to said second set of diodes, and wherein said additional capacitors divided into two sets are connected to to alternate junctions between said second set of diodes.

5. A converter as defined in claim 4 wherein each of said one set of capacitors is connected directly to said one of said pair of AC junctions, and each of said other set of capacitors is connected directly to said other of said pair of AC junctions.

6. A converter as defined in claim 4 wherein each of said one set of capacitors is connected to said one of said pair of AC junctions in series sequence, and each of said other set of capacitors is connected to said other of said pair of AC junctions in series sequence.

7. A converter as defined in claim 4 wherein each of a portion of each of said one set and said other set of capacitors is connected directly to said one pair of AC junctions and each of another portion of said one set and said other set of capacitors is connected in series sequence to said DC output terminal.

8. An oscillator having four transistors interconnected at four junctions to form a four-sided bridge circuit, with one transistor on each of the four sides of the bridge, and means for alternately turning on and off said transistors in pairs on opposite sides so that an AC voltage is obtained from one pair of opposite junctions while a DC voltage is applied to the remaining pair of junctions, one of said switches in each pair being of one conductivity type and the other of said switches in each pair being of opposite conductivity type, with transistors connected to DC junctions being of the same conductivity type, said means for alternately turning on and off said transistors comprising RC timing circuits cross coupling control terminals of said transistors with control terminals of both transistors in adjacent sides of said bridge being coupled to an AC junction on the opposite side of said bridge, each of said RC timing circuits being comprised of a resistor connected between control terminals of said transistors on adjacent sides of said bridge, two capacitors connected in series between control terminals of said transistors on adjacent sides of said bridge, and a resistor connected between the AC junction on the opposite side of said bridge and a junction between said series connected capacitors, whereby said transistors connected in a bridge circuit are operated in a free running multivibrator mode.

* * * * *